April 5, 1938.　　　C. R. BARNARD　　　2,112,902
ATTACHMENT FOR A DISK CARRYING IMPLEMENT
Filed Aug. 30, 1937　　　3 Sheets-Sheet 2
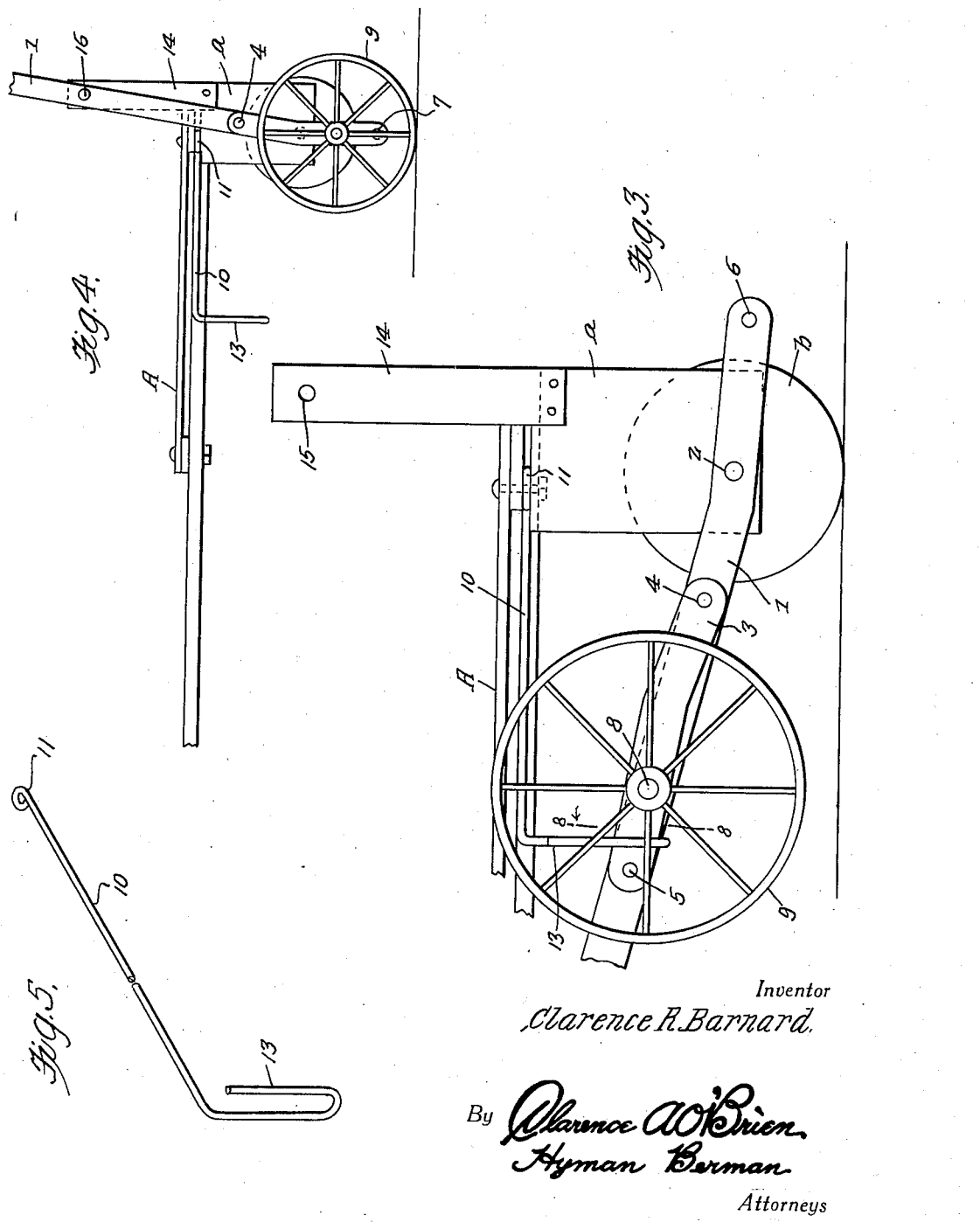
Inventor
*Clarence R. Barnard,*
By *Clarence A. O'Brien*
*Hyman Berman*
Attorneys

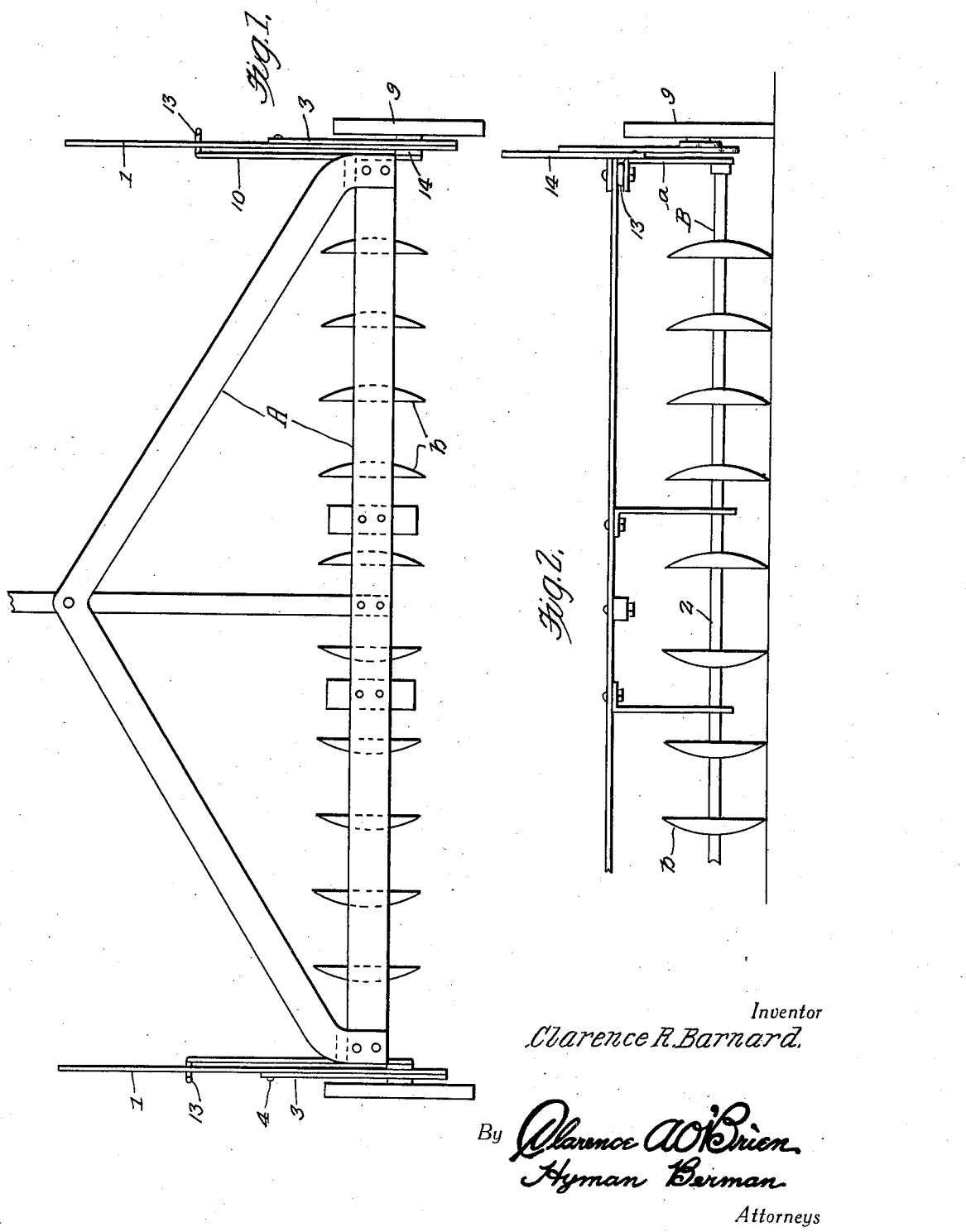

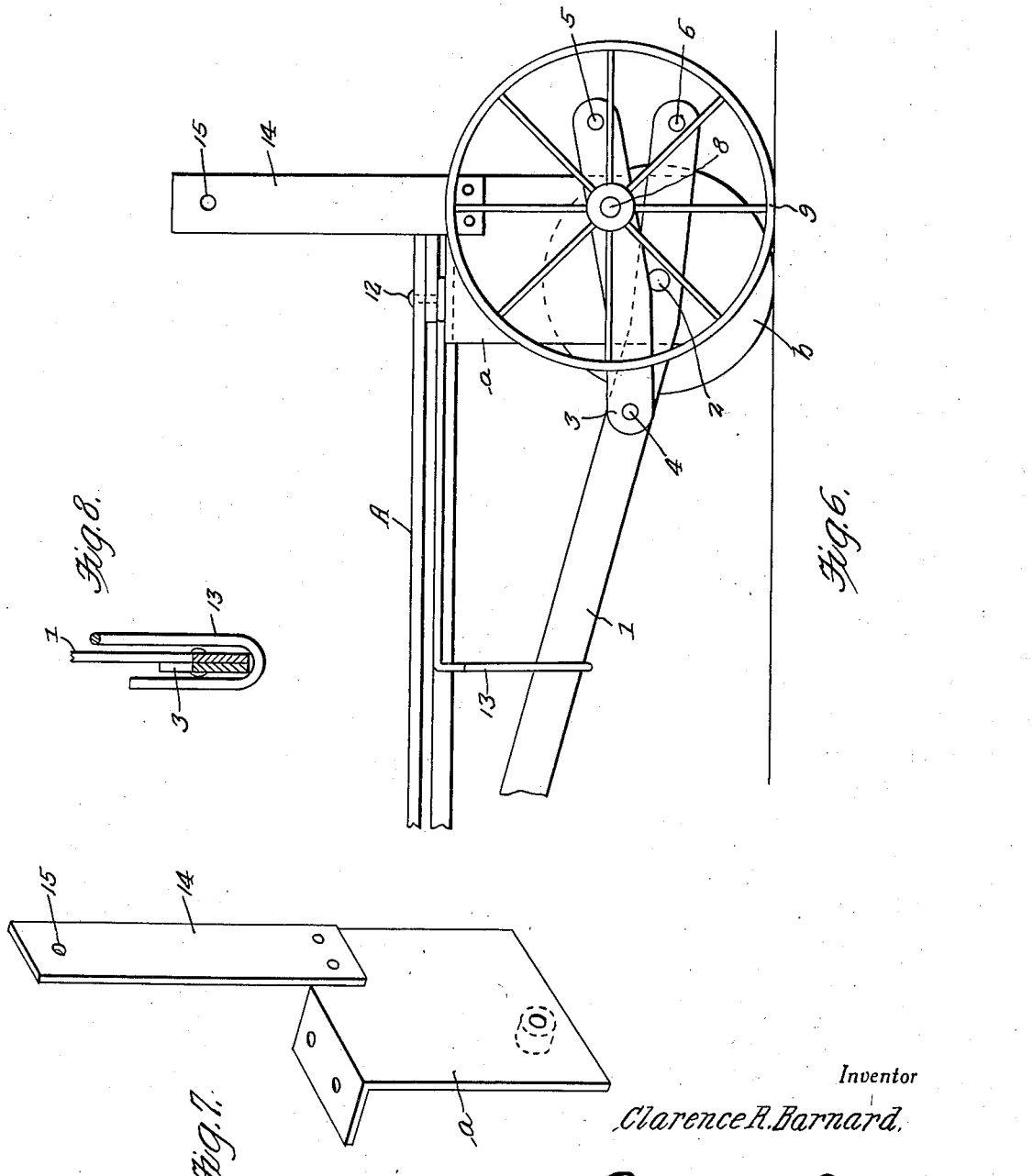

Patented Apr. 5, 1938

2,112,902

UNITED STATES PATENT OFFICE 2,112,902

ATTACHMENT FOR A DISK CARRYING IMPLEMENT

Clarence Russel Barnard, Terre Haute, Ind., assignor of one-half to Lillian L. Barnard, Terre Haute, Ind.

Application August 30, 1937, Serial No. 161,711

2 Claims. (Cl. 55—73)

This invention relates to an attachment for a disk carrying implement, the general object of the invention being to provide means including wheels, whereby the disks can be raised with the wheels engaging the ground, when the implement is to be transported from place to place, the wheel carrying means being positioned to lift the wheels off the ground to permit the disks to engage the ground, when the implement is being used in a field.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of an implement provided with the invention.

Figure 2 is a fragmentary rear view of Figure 1 but with the wheels in the position shown in Figure 6.

Figure 3 is a fragmentary elevation showing the parts in position with the wheel in raised position.

Figure 4 is a similar view but showing the wheel in lowered position and the disks in raised position.

Figure 5 is a view of the holding member.

Figure 6 is a fragmentary elevation and showing the parts in a position with the wheel about to be swung over into raised position.

Figure 7 is a view of one of the supporting brackets at the rear of the frame.

Figure 8 is a section on the line 8—8 of Figure 3 but not showing the wheel.

In these views the letter A indicates a frame of an implement which includes the depending plate-like parts a at the ends or sides of the frame and these members a carry the shaft B on which the disks b are arranged.

In carrying out my invention I provide a long lever I for each side of the frame and each lever is pivoted to the outer face of each member a as shown at 2. The lever includes a long part and a short part which is arranged at a slight angle from the long part and the pivot passes through the short part adjacent the end thereof which is connected with the long part. A short lever 3 also including a long part and a short part arranged at a slight angle to the long part, has one end connected by a pivot 4 to the long part of the lever I adjacent the point where the long part joins the short part and the other end of the lever 3 has a bolt receiving hole 5 therein which will align with a similar hole 6 in the free end of the short part of the lever I when the lever 3 is swung to a position covering the short part of the lever I. A bolt 7 is adapted to be passed through the holes 5 and 6, as shown in Figure 4 to hold the lever 3 in position covering the short end of the lever I. Said lever 3 carries the spindle 8 for the wheel 9, the spindle being arranged nearer the free end of the lever 3 than the pivoted end thereof.

A rod 10, shown in detail in Figure 5 is located at each side of the main frame and has an eye 11 at its rear end which receives a bolt 12 which passes through a part of the frame and connects the rod to said frame. The rod extends forwardly and has a depending U-shaped part 13 at its front end which forms a rest for the lever I when the same is in a certain position and it also forms a rest for the lever 3 when said lever 3 is in a certain position. An extension plate 14 is connected with the member a and extends upwardly as shown and has a hole 15 at its upper end.

When the implement is to be transported from one place to another, such as over a road or the like and it is not desired for the disks to contact the ground, the lever 3 is placed over the short end or part of the lever I, and the bolt 7 is passed through the holes 5 and 6 to hold the lever 3 in position covering the short part of the lever I. Then the lever I is swung upwardly and held in this position by a bolt 16 passing through a hole in the lever I and the hole 15 in the extension 14. In this position of the parts the wheels 9 will engage the ground and will support the implement in raised position with the disks located above the ground as shown in Figure 4. Then the device can be pulled along a road or the like with the wheels contacting the road surface and the disk out of contact with such surface. Then when the device or implement is to be used on a field or the like the levers I are swung downwardly and the bolts 7 removed and this will cause the levers 3 and wheels 9 to assume the position shown in Figure 6 with the disks contacting the ground. Then the levers 3 and wheels 9 are swung over into the position shown in Figure 3 with the levers 3 fitting in the loops 13. As will be seen from Figure 3 this position of the parts will hold the wheels well above the ground while permitting the disks to engage the ground.

When the invention is used on a sectional implement the sections can be connected together in any suitable manner at their inner edges so that the inner portions of the sections will be held in raised position as the wheels are holding the outer portions in raised position.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:—

1. In combination with an implement having ground engaging elements thereon and including a frame having depending parts at its sides, a lever pivoted to each depending part at a point spaced from one end thereof, a short lever pivoted at its front end to the first lever in front of the pivotal point of the first lever, means for detachably connecting the other end of the short lever to the rear end of the first lever, a wheel rotatably connected with the intermediate part of the short lever, means for holding the first lever in substantially vertical position with the wheels holding the ground engaging elements off the ground and means for supporting the first lever in lowered position, said means also supporting the free end of the second lever after the same has been swung forwardly to raise the wheel off the ground.

2. An attachment for an apparatus having ground engaging elements comprising a lever adapted to be pivoted to a part of the apparatus at a point spaced from one end thereof, a short lever pivoted at its front end to the first lever in front of the pivotal point of the first lever, a bolt detachably connecting the free end of the short lever with the rear end of the first lever, a spindle carried by an intermediate part of the short lever, a wheel on said spindle, an upright member, means for detachably connecting a part of the first lever to said upright member to hold the first lever in substantially vertical position with the wheel engaging the ground, a bar having a vertically arranged loop at one end thereof, said loop receiving the first lever when the same is swung downwardly from its vertical position and said bar also receiving the bolt receiving end of the second lever when the same is swung forwardly.

his
CLARENCE × RUSSEL BARNARD.
mark

Witness to mark:
WALTER E. BEYERMANN.